US012411797B2

(12) United States Patent
Beaudoin et al.

(10) Patent No.: US 12,411,797 B2
(45) Date of Patent: Sep. 9, 2025

(54) INTERRUPT LATENCY AND ERROR RESILIENT FULL-DUPLEX SPI DRIVER

(71) Applicant: Silicon Laboratories Inc., Austin, TX (US)

(72) Inventors: Simon Beaudoin, Beloeil (CA); Yacin Belmihoub-Martel, Montréal (CA); Francois Killeen, Laval (CA); Damien Riegel, Montréal (CA); Alexandre Autotte Portelance, St. Hubert (CA)

(73) Assignee: Silicon Laboratories Inc., Austin, TX (US)

( * ) Notice: Subject to any disclaimer, the term of this patent is extended or adjusted under 35 U.S.C. 154(b) by 119 days.

(21) Appl. No.: 18/211,877

(22) Filed: Jun. 20, 2023

(65) Prior Publication Data

US 2024/0427726 A1 Dec. 26, 2024

(51) Int. Cl.
*G06F 13/42* (2006.01)
*G06F 13/28* (2006.01)

(52) U.S. Cl.
CPC .......... *G06F 13/4291* (2013.01); *G06F 13/28* (2013.01)

(58) Field of Classification Search
None
See application file for complete search history.

(56) References Cited

U.S. PATENT DOCUMENTS

| | | | | |
|---|---|---|---|---|
| 4,276,656 A | * | 6/1981 | Petryk, Jr. ........... | H04L 25/4904 375/333 |
| 2001/0007999 A1 | * | 7/2001 | Rasmussen ........... | G06F 13/126 710/60 |
| 2002/0099877 A1 | * | 7/2002 | Hirabayashi ........ | G06F 13/4291 710/5 |
| 2008/0235411 A1 | * | 9/2008 | Zhang ................. | G06F 13/4291 710/28 |
| 2018/0059966 A1 | * | 3/2018 | Lee ........................ | G06F 13/28 |

* cited by examiner

*Primary Examiner* — Rehana Perveen
(74) *Attorney, Agent, or Firm* — Nields, Lemack & Frame, LLC

(57) ABSTRACT

A system and method of transmitting data between a host and a peripheral device using Serial Peripheral Interface protocol is disclosed. The host and peripheral device redefine the interrupt signal so that it serves as a traditional interrupt signal during most times, but during certain parts of the transmission, it serves as a READY signal, indicating that the host should wait before sending the payload. In this way, transmissions are performed where the likelihood of data loss is greatly reduced or eliminated. Further, because the peripheral device is able to stall the host, full duplex transmissions are made possible.

16 Claims, 7 Drawing Sheets

INTERRUPT LATENCY AND ERROR RESILIENT FULL-DUPLEX SPI DRIVER

FIELD

This disclosure describes a system and method to deliver packets between a host and a device using Serial Peripheral Interface (SPI).

BACKGROUND

The Serial Peripheral Interface (SPI) communication interface is one of many serial interfaces that are currently in use. The SPI interface is a wired bus that includes 4 signals in its standard form. There is a clock signal, a MOSI (Master Out Slave In) signal, and a chip select (CS) signal. All of these signals are driven by the host. Additionally, there is a MISO (Master In Slave Out) signal, which is driven by the peripheral device.

In operation, the host controls all transactions. Specifically, for transactions from the host to the peripheral device, the host asserts the chip select signal of the peripheral device to which it wishes to communicate. It then generates a series of clock pulses, wherein during each clock pulse, a bit of information is transmitted from the host to the peripheral device, and/or from the peripheral to the host. The SPI specification allows flexibility in the structure and meaning of the bytes that are transmitted. In certain embodiments, each transaction begins with the transmission of a header, which may be 7 bytes in length. The header may include the length of the payload, in bytes, which the host will send, as well as an error detection or correction code.

In this embodiment, after transmission of the header, the host then transmits the payload, wherein the number of bytes to be transmitted were defined in the header. To transmit the payload, the host generates a series of clock pulses, wherein one bit of information is transmitted during each clock pulse. Following the transmission of the payload, the host deasserts the chip select and the clock signal remains static.

This protocol is effective but may be susceptible to various issues. For example, the peripheral device may have limited resources, such as, for example, a single processor and a single receive direct memory access (DMA) controller. In the sequence described above, the peripheral device must receive the header, ensure that the CRC is correct and then set up the receive DMA controller to receive the number of bytes that were specified in the header. Note, as well, that since there is only a single processor, it is also possible that the processor is servicing another higher priority task when the header is received. Thus, it is possible that the host may begin transmitting the payload before the peripheral device has configured the receive DMA controller. This may result in lost data.

One approach to address this issue is to introduce delays in the software that is resident on the host, also referred to as the driver. For example, after transmitting the header, the driver may insert a delay of a particular duration, where that duration is selected so as to be at least as long as the expected maximum processing delay that is experienced on the peripheral device.

While this may alleviate the issue identified above, it presents two new issues. First, the delay is incurred in all transmissions, even those where the peripheral device was ready to receive the payload earlier. This results in wasted time and bandwidth. Second, it is still possible that the processing delay experienced by the peripheral device is greater than the delay introduced by the driver, resulting again in lost data.

Therefore, it would be beneficial if there was a driver and associated software on the peripheral that eliminated the possibility of lost data without introducing unnecessary delays. Further, it would be advantageous if the new driver and peripheral software also operated in bidirectional mode.

SUMMARY

A system and method of transmitting data between a host and a peripheral device using Serial Peripheral Interface protocol is disclosed. The host and peripheral device redefine the interrupt signal so that it serves as a traditional interrupt signal during most times, but during certain parts of the transmission, it serves as a READY signal, indicating that the host should wait before sending the payload. In this way, transmissions are performed where the likelihood of data loss is eliminated and synchronization is guaranteed. Further, because the peripheral device is able to introduce a synchronization point after the header transmission, full duplex transmissions are made possible.

According to one embodiment, a method of transmitting a payload from a host to a peripheral device using Serial Peripheral Interface (SPI) is disclosed. The method comprises asserting, by the host, a chip select (CS) signal to indicate that a transmission is intended for the peripheral device; transmitting a header from the host to the peripheral device, wherein the header contains a number of bytes contained in the payload; ensuring, at the peripheral device, after receipt of a final byte of the header, that an IRQ signal is deasserted, which signals that the peripheral device is not ready to receive the payload; performing operations at the peripheral device to prepare to receive the payload; asserting, by the peripheral device, the IRQ signal, after performing the operations, to indicate that the peripheral device is ready to receive the payload; and transmitting, by the host, the payload after detecting an assertion of the IRQ signal.

In some embodiments, the method further comprises deasserting, by the host, the chip select (CS) signal after transmission of the header; asserting, by the host, the chip select (CS) signal after seeing the IRQ signal asserted by the peripheral device and before transmitting the payload; and deasserting, by the host, the chip select (CS) signal after transmitting the payload. In certain embodiments, the host asserts and deasserts the chip select (CS) signal even if the number of bytes in the payload is zero. In certain embodiments, if the peripheral device detects an error in the header, the peripheral device discards all data until the chip select (CS) signal is deasserted by the host after the payload is transmitted.

In some embodiments, the operations at the peripheral device comprise configuring a direct memory access (DMA) controller to receive the number of bytes of payload indicated by the header. In certain embodiments, the operations at the peripheral device further comprise configuring the DMA controller to receive a subsequent header after receipt of the payload. In certain embodiments, the operations at the peripheral device further comprise servicing other higher priority interrupts.

According to another embodiment, a method of transmitting a payload from a peripheral device to a host using Serial Peripheral Interface (SPI) is disclosed. The method comprises asserting, by the peripheral device, an IRQ signal, indicating that it has data to transmit to the host; asserting, by the host, after seeing the IRQ signal asserted, a chip select (CS) signal to indicate that a transmission is intended for the peripheral device; transmitting a header to the host from the peripheral device, wherein the header contains a number of bytes contained in the payload; ensuring, at the peripheral device, after transmission of a final byte of the header, that the IRQ signal is deasserted, which signals that the peripheral device is not ready to transmit the payload; performing operations at the peripheral device to prepare to transmit the payload; asserting, by the peripheral device, the IRQ signal, after performing the operations, to indicate that the peripheral device is ready to transmit the payload; and transmitting, by the peripheral device, the payload after the host detects an assertion of the IRQ signal. In some embodiments, the method further comprises deasserting, by the host, the chip select (CS) signal after receipt of the header; asserting, by the host, the chip select (CS) signal after seeing the IRQ signal asserted by the peripheral device and before receiving the payload; and deasserting, by the host, the chip select (CS) signal after receiving the payload. In some embodiments, the operations at the peripheral device comprise determining whether the host is also transmitting a payload to the peripheral device. In some embodiments, if the host detects an error in the header, the host assumes a maximum payload to ensure that the peripheral device is able to transmit its entire payload.

In some embodiments, in a case of full duplex operation, the host also has a payload to transmit to the peripheral device; and wherein the host transmits a header to the peripheral device having a same length as the header transmitted by the peripheral device; wherein the host transmits the header at the same time that the header is transmitted by the peripheral device. In certain embodiments, the host transmits a payload to the peripheral device at a same time that the payload is transmitted to the host. In certain embodiments, the operations at the peripheral device comprise configuring a direct memory access (DMA) controller to receive the number of bytes of payload indicated by the header transmitted by the host. In certain embodiments, the operations at the peripheral device further comprise configuring the DMA controller to receive a subsequent header after receipt of the payload.

According to another embodiment, a method of transmitting a payload from a host to a peripheral device using Serial Peripheral Interface (SPI) is disclosed. The method comprises transmitting a header from the host to the peripheral device, wherein the header contains a number of bytes contained in the payload; using, by the peripheral device, an IRQ signal to indicate whether it is ready to receive the payload; and transmitting the payload from the host to the peripheral device after seeing the IRQ signal asserted. In some embodiments, the IRQ signal serves as a READY signal between an end of the header and a start of the payload, and serves as an interrupt signal at all other times.

BRIEF DESCRIPTION OF THE DRAWINGS

For a better understanding of the present disclosure, reference is made to the accompanying drawings, in which like elements are referenced with like numerals, and in which.

DETAILED DESCRIPTION

This disclosure describes a system and method by which a host and a peripheral device communicate using Serial Peripheral Interface (SPI). The method is interrupt latency and error resilient. The system and method achieve this objective by modifying the interrupt (IRQ) signal to have two different meanings, depending on the current status of the transmissions.

Figure 1:
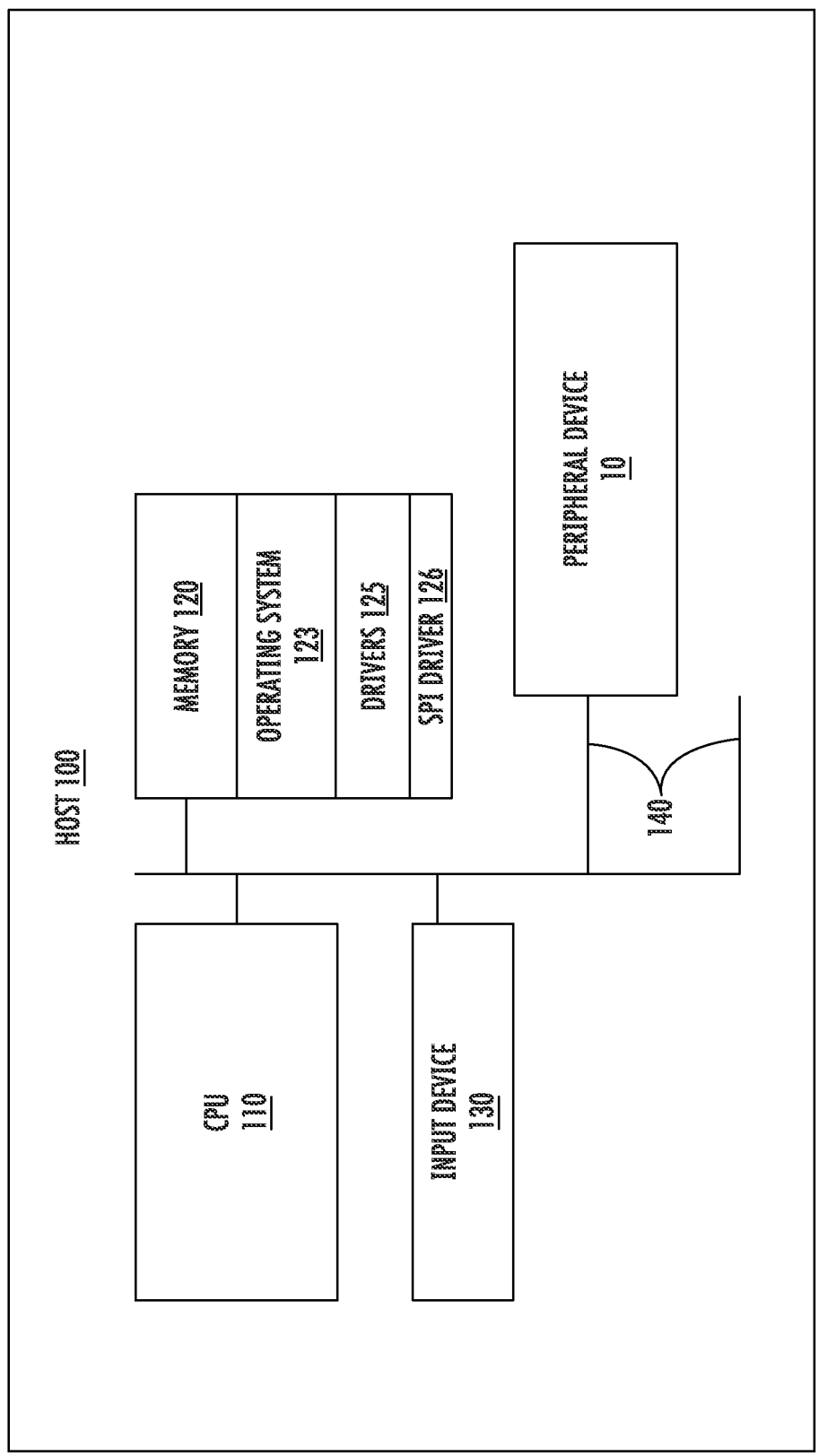
FIG. 1 shows the configuration of the host and peripheral device.

FIG. 1 shows an example configuration of a host 100 and a peripheral device 10. The host 100 may be a personal computer, server or other computing device. The host 100 includes a processing unit, such as a central processing unit (CPU) 110, and a memory device 120 that contains the instructions executed by the CPU. In addition, the host 100 may include other functionality, such as a graphics processor, an input device 130, a DMA controller and others. The host 100 may utilize any operating system 123, such as Windows®, Linux, iOS or others. In addition to an operating system 123, the host 100 contains additional software, referred to as drivers 125, that interact with various hardware components that are part of or are connected to the host 100. Typical drivers include video drivers, printer drivers, and others. The host 100 also includes a SPI driver 126, which is described in more detail below. The operating system 123 and the drivers 125 are instructions which are contained within the memory device 120. Additionally, the host 100 may include connectors 140 that allow for the insertion of peripheral components, such as peripheral device 10.

Figure 2:
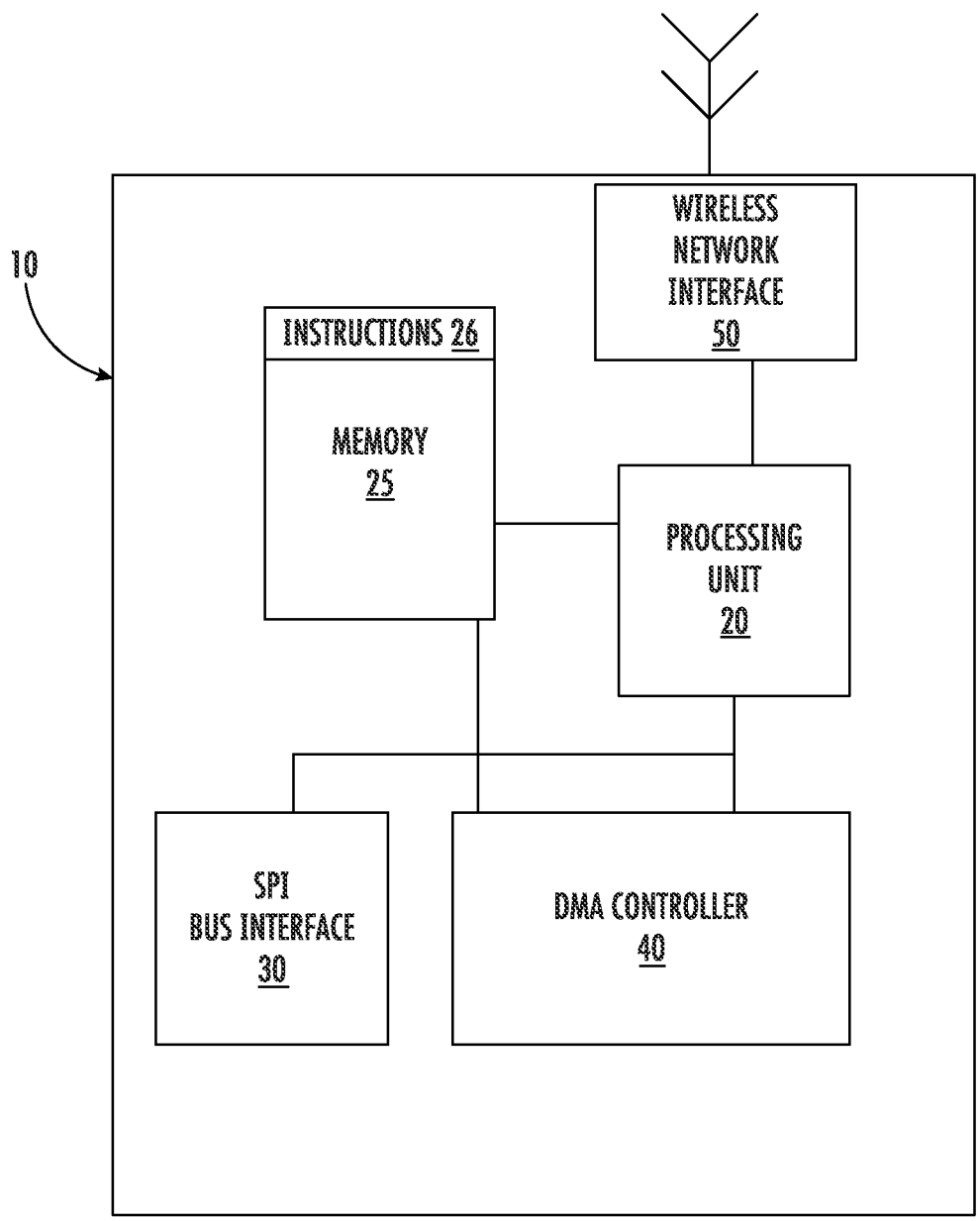
FIG. 2 shows a block diagram of a peripheral device according to one embodiment.

FIG. 2 shows a block diagram of a representative peripheral device 10 that may be used in conjunction with the SPI driver 126 to achieve interrupt latency and error resilient communication between the host 100 and the peripheral device 10.

The peripheral device 10 has a processing unit 20 and an associated memory device 25. The processing unit 20 may be any suitable component, such as a microprocessor, embedded processor, an application specific circuit, a programmable circuit, a microcontroller, or another similar device. This memory device 25 contains the instructions which, when executed by the processing unit 20, enable the peripheral device 10 to perform the functions described herein. This memory device 25 may be a non-volatile memory, such as a FLASH ROM, an electrically erasable ROM or other suitable devices. In other embodiments, the memory device 25 may be a volatile memory, such as a RAM or DRAM.

While a memory device 25 is disclosed, any computer readable medium may be employed to store these instructions. For example, read only memory (ROM), a random access memory (RAM), a magnetic storage device, such as a hard disk drive, or an optical storage device, such as a CD or DVD, may be employed. Furthermore, these instructions may be downloaded into the memory device 25, such as for example, over a network connection (not shown), via CD ROM, or by another mechanism. These instructions may be written in any programming language, which is not limited by this disclosure. Thus, in some embodiments, there may be multiple computer readable non-transitory media that contain the instructions described herein. The first computer readable non-transitory media may be in communication with the processing unit 20, as shown in FIG. 2. The second computer readable non-transitory media may be a CDROM, or a different memory device, which is located remote from the peripheral device 10. The instructions contained on this second computer readable non-transitory media may be downloaded onto the memory device 25 to allow execution of the instructions by the peripheral device 10.

The peripheral device 10 also includes a SPI bus interface 30 that connects with a SPI interface located on the connector 140. The SPI interface includes a clock signal, a Master In Slave Out (MISO) signal, a Master Out Slave In (MOSI) signal, and a chip select (CS) signal. Although not part of the SPI interface, the peripheral device 10 and the host 100 also share an interrupt (IRQ) signal.

The peripheral device 10 includes a direct memory access (DMA) controller 40, which may be a linking DMA controller, that allows data to be directly read from or written to the memory device 25. The DMA controller 40 may include two channels, one for the transmission of outgoing data and one for the reception of incoming data. The DMA controller 40 operates through the use of descriptors. These descriptors, which are structures that are provided to the DMA controller 40, inform the DMA controller as to the memory address where the data is to be read from or written to, and the number of bytes of data that are associated with this transfer. Multiple descriptors are linked together such that the DMA controller 40 is able to execute a sophisticated set of steps without the need for CPU intervention.

The peripheral device 10 may include other functions as well. For example, in certain embodiments, the peripheral device 10 may include a wireless network interface 50 to enable wireless communications using Bluetooth, Zigbee or some other wireless protocol.

While the processing unit 20, the memory device 25, the SPI bus interface 30, the wireless network interface 50 and the DMA controller 40 are shown in FIG. 2 as separate components, it is understood that some or all of these components may be integrated into a single electronic component. Rather, FIG. 2 is used to illustrate the functionality of the peripheral device 10, not its physical configuration.

Figure 3A:
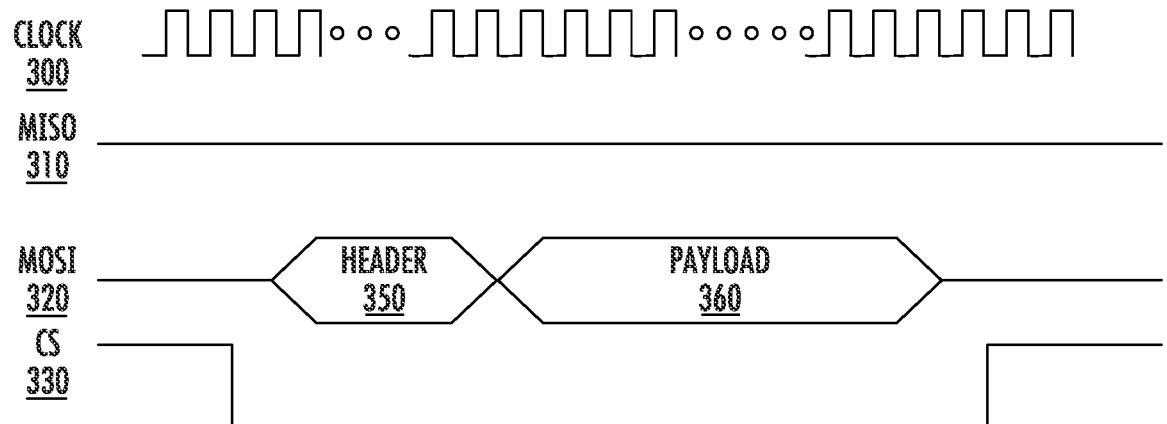
FIGS. 3A-3B show transactions using the SPI interface according to the prior art.

A traditional SPI transmission includes a header and optionally a payload. The header, which may be a HDLC header, may be fixed in length and include a byte count that indicates the number of bytes that will be contained in the payload. The header may also include an error detecting code. The host drives the clock signal and one bit of information is transmitted each clock cycle. Note that the peripheral device 10 cannot affect the generation of the clock signal. FIG. 3A shows a typical host initiated transaction according to the prior art, where the host 100 is transmitting data to the peripheral device 10. The host 100 asserts the chip select (CS) signal 330 to indicate that the transmission is for this peripheral device 10. The host 100 then toggles the clock signal 300 while transmitting information on the MOSI signal 320. The first predetermined number of bytes constitutes the header 350. The host 100 then continues cycling the clock signal 300 and transmits additional information on the MOSI signal 320, which is the payload 360. When the entire payload has been transmitted, the host deasserts the chip select (CS) signal 330 and stops cycling the clock signal 300.

Figure 3B:
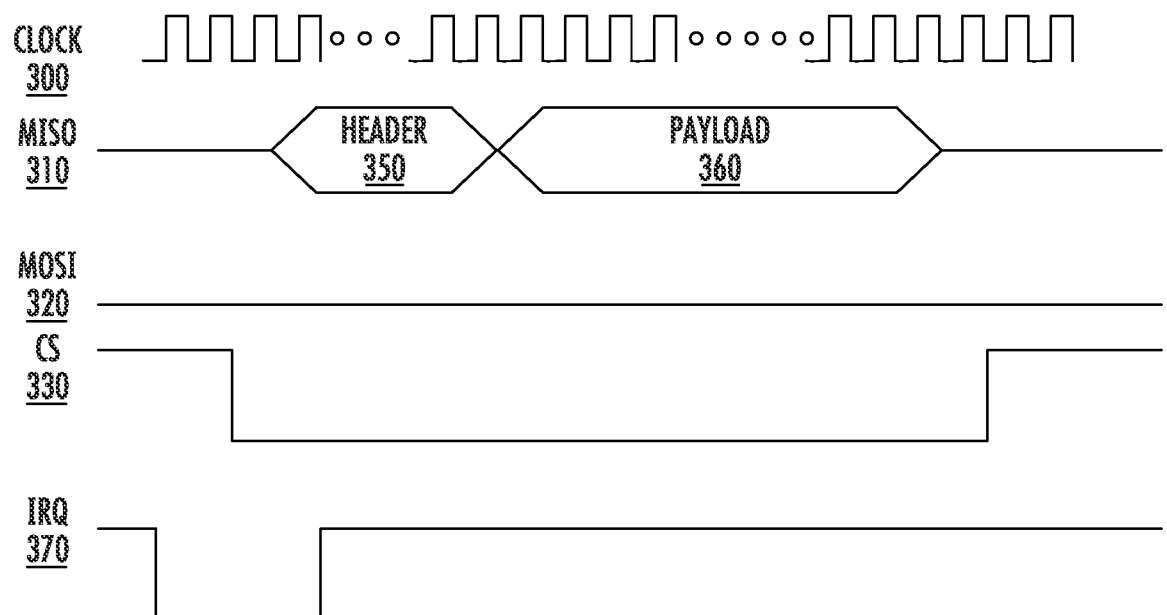

FIG. 3B shows a typical peripheral device initiated transaction according to the prior art, where the host 100 is receiving data from the peripheral device 10. To alert the host 100 that it has data to transmit, the peripheral device 10 asserts the IRQ signal 370. In response, the host 100 asserts the chip select (CS) signal 330 to indicate that the transmission is for this peripheral device 10. The host 100 then toggles the clock signal 300. The peripheral device 10 transmits one bit of data on the MISO signal 310 for each clock cycle. The first predetermined number of bytes, which may be 7 bytes, constitutes the header 350. The host 100 then continues cycling the clock signal 300 and the peripheral device 10 transmits additional information on the MISO signal 310, which is the payload 360. When the entire payload has been transmitted, the host deasserts the chip select (CS) signal 330 and stops cycling the clock signal 300.

Note that full duplex bidirectional communications are also possible. In this embodiment, both the host 100 and the peripheral device 10 transmit a header 350 and a payload 360. These payloads may be the same or different lengths. However, the headers 350 are always the same length and transmitted at the same time in both directions.

As noted above, there are potential issues with these transactions. Specifically, in the case of a host initiated transfer, the peripheral device 10 needs to configure the DMA controller 40 to receive the proper number of bytes of payload 360, which was defined in the header 350. If the host 100 begins transmitting the payload 360 before the DMA controller 40 is configured, data may be lost.

The present disclosure addresses this issue by using the IRQ signal to signify different conditions. Specifically, as described above, during some periods of time, the IRQ signal 370 is used to indicate that the peripheral device 10 has data to transmit to the host 100. However, the IRQ signal 370 is also used during other periods of time to signify that the peripheral device 10 is ready to receive the payload 360 from the host 100.

Figure 4:
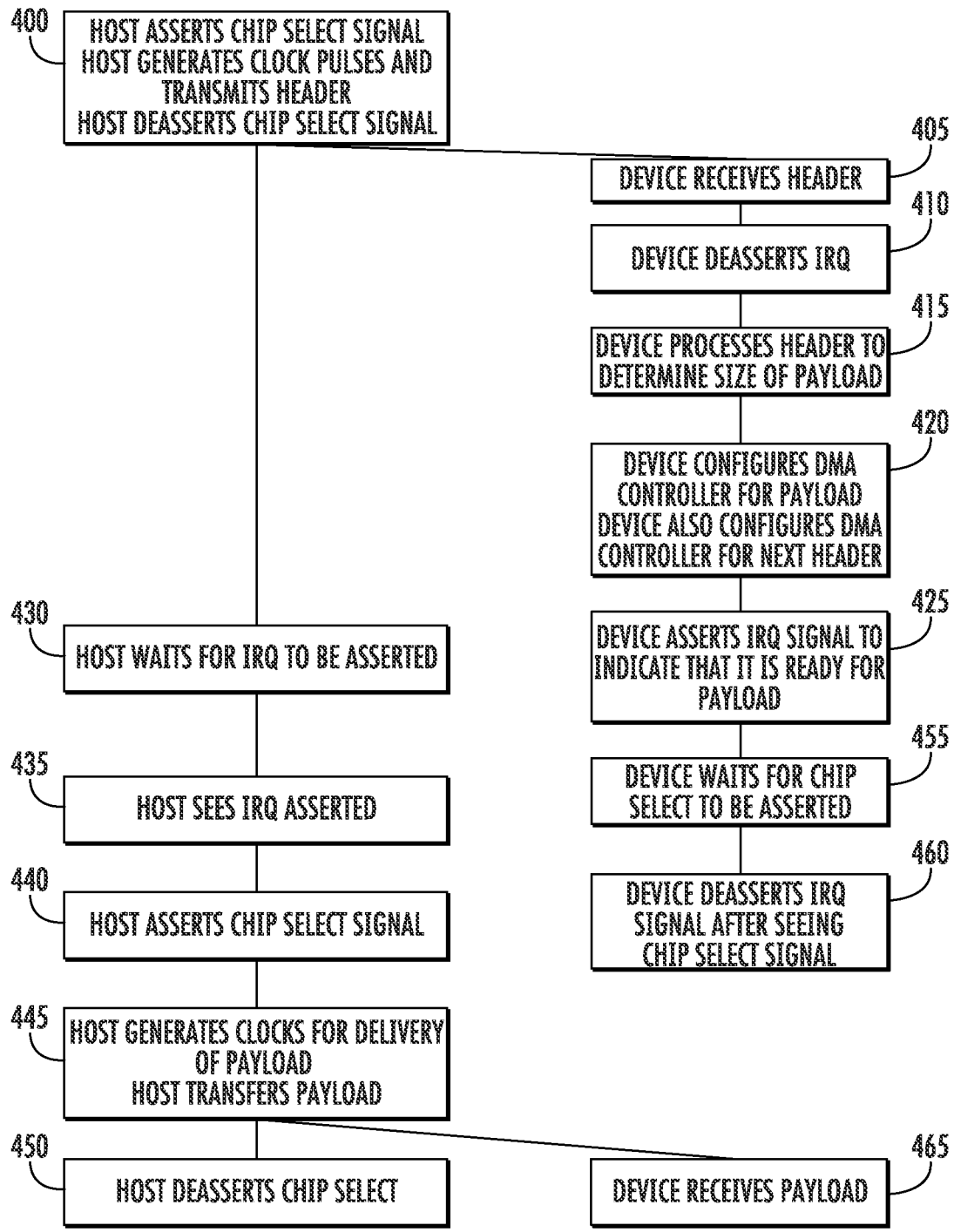
FIG. 4 is a flowchart showing the operation of the host and peripheral device during host initiated transmissions.
Figure 5:
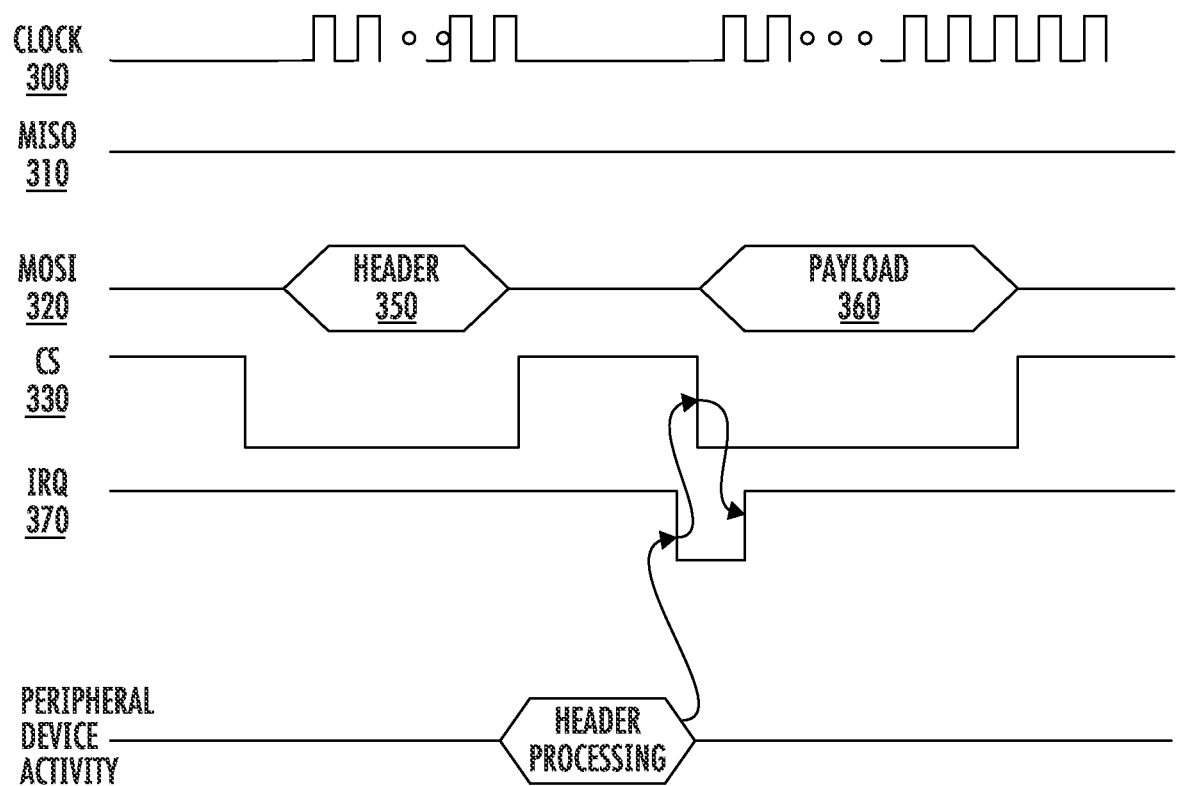
FIG. 5 is a timing diagram associated with the operation shown in FIG. 4.

FIG. 4 shows a flowchart that shows the operation of the SPI driver 126 and the peripheral device 10 during a host initiated transaction, according to the present disclosure. FIG. 5 shows a timing diagram that reflects the flow shown in FIG. 4.

First, as shown in Box 400, the sequence begins with the host 100 asserting the chip select (CS) signal 330, indicating that the upcoming transaction is intended for this peripheral device 10. The host 100 then begins cycling the clock signal 300 and transmits the header 350 on the MOSI signal 320. As the clock signal 300 is toggled, the peripheral device 10 receives the header 350 as shown in Box 405.

After completion of the header 350, as shown in Box 410, the peripheral device 10 immediately deasserts the IRQ signal 370, if it was previously asserted. Then, the peripheral device 10 begins to process the header 350, as shown in Box 415. At this time, the peripheral device 10 determines the number of bytes in the payload 360 and verifies the integrity of the header 350. If the header is valid, the peripheral device 10 configures the DMA controller 40 to receive the payload 360, as shown in Box 420. The peripheral device 10 also configures the DMA controller 40 to receive a subsequent header. This can readily be performed at this time, since the length of the header is fixed. This may be done by writing receive DMA descriptors, which the DMA controller 40 can access.

If, on the other hand, the header 350 is invalid, the peripheral device 10 cannot trust the payload length field. In this case, the whole payload 360 to be received is discarded as the DMA controller 40 cannot be armed with a length that can be trusted. The DMA controller 40 then synchronizes with the transitions of the chip select (CS) signal 330 of the payload 360. The DMA controller 40 discards the data, and becomes synchronized again with the host 100 with the low-to-high transition of the chip select (CS) signal 330 at the end of the payload 360. The peripheral device 10 also configures the DMA controller 40 to receive a subsequent header.

After the DMA controller 40 has been properly configured, the peripheral device 10 asserts the IRQ signal 370, as shown in Box 425. Note that there is no limit on the amount of time that the peripheral device 10 may consume in processing the header. This is to accommodate situations when the device is busy in higher priority or non-maskable interrupts (typically related to wireless network activity, which has strict requirements). This way, this SPI protocol can co-exist well alongside other pieces of firmware with more stringent real-time requirements.

While the peripheral device 10 is performing the above mentioned operations, the host 100 is waiting for the IRQ signal 370 to be asserted, as shown in Box 430. During this time, the chip select (CS) signal is deasserted and the clock signal 300 is not cycling. In other words, the transaction is effectively paused, while the host 100 waits for the peripheral device 10 to be ready for the payload 360. Eventually, the host 100 sees that the IRQ signal 370 is asserted, as shown in Box 435. Some time after, the host 100 asserts the chip select (CS) signal 330, indicating that it is communicating with the peripheral device 10, as shown in Box 440. The host 100 then begins cycling the clock signal 300 and delivers the payload 360 over the MOSI signal 320, as shown in Box 445. Following completion of the payload 360, the host 100 deasserts the chip select (CS) signal 330, indicating that the transmission is complete, as shown in Box 450.

Note that even if the header 350 indicates that the payload 360 contains 0 bytes, the host 100 still asserts the chip select (CS) signal 330 and then deasserts the chip select (CS) signal 330. This mechanism is incorporated as an error resilient feature. In this way, even if the bytes of the header are not received correctly, the peripheral device 10 is able to stay synchronized, since there are always two durations of time where the chip select (CS) signal 330 is asserted for each transaction.

Meanwhile, after asserting the IRQ signal 370, the peripheral device 10 waits to see the chip select (CS) signal 330 asserted, as shown in Box 455. The assertion of the chip select (CS) signal 330 signifies that the host 100 recognizes that the peripheral device 10 was ready to receive the payload 360. Thus, once the chip select (CS) signal 330 is asserted, the peripheral device 10 may deassert the IRQ signal, as shown in Box 460. Lastly, as shown in Box 465, the peripheral device 10 receives the payload 360 as it is transmitted by the host 100.

Note that from the time that the peripheral device 10 receives the header 350 to the time that the payload 360 is starting to be transmitted, the IRQ signal 370 serves as a READY signal, indicating when the peripheral device 10 is ready to receive the payload 360. At all other times, the IRQ signal 370 retains its original function as an interrupt signal.

FIGS. 4-5 show the concept of using the IRQ signal 370 to serve as a READY signal to allow the peripheral device 10 to process the incoming header and configure the DMA controller 40 before the host 100 sends the payload 360. This same concept applies when the peripheral device 10 has data to transmit to the host 100.

Figure 6:
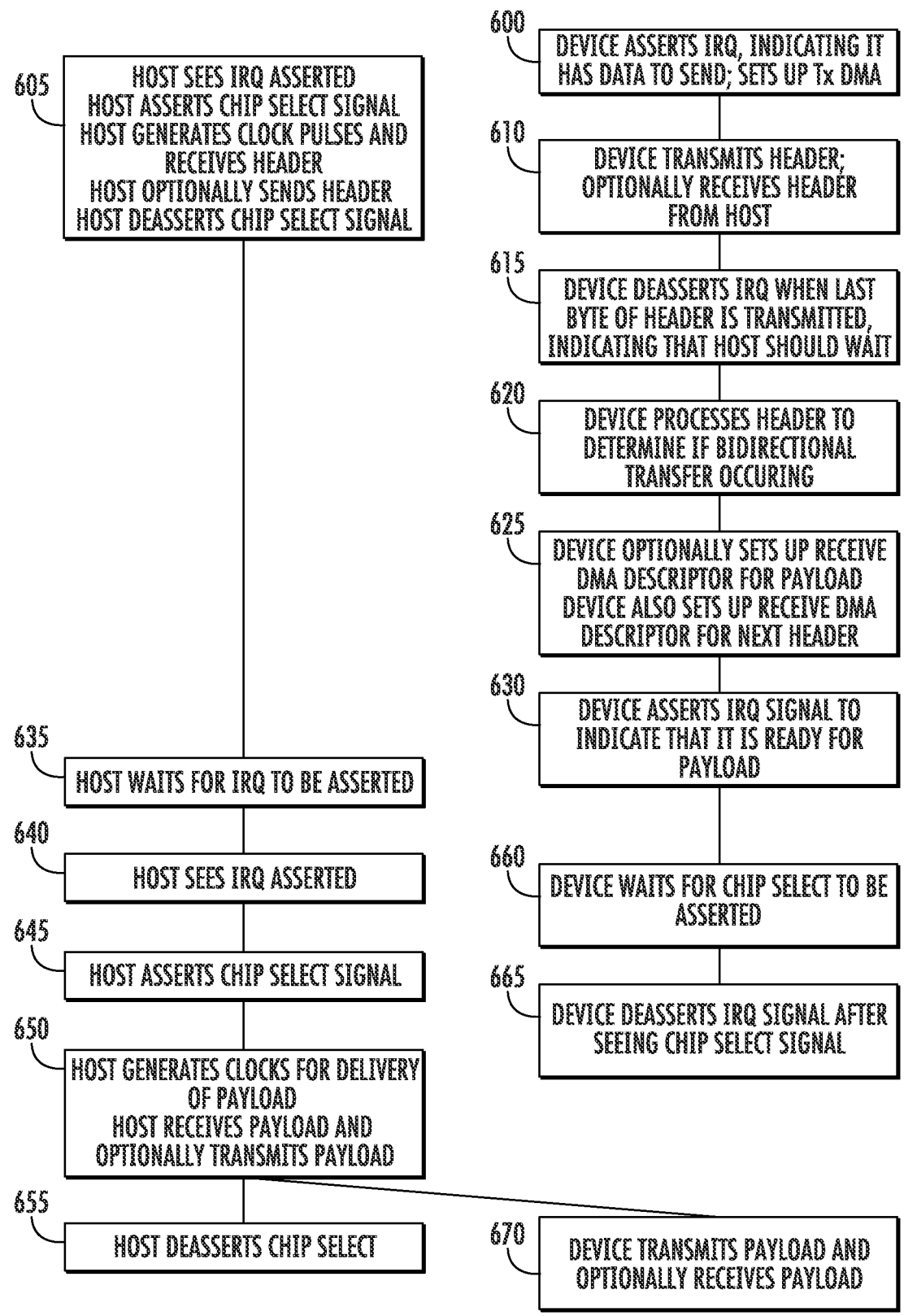
FIG. 6 is a flowchart showing the operation of the host and peripheral device during host initiated transmissions.
Figure 7:
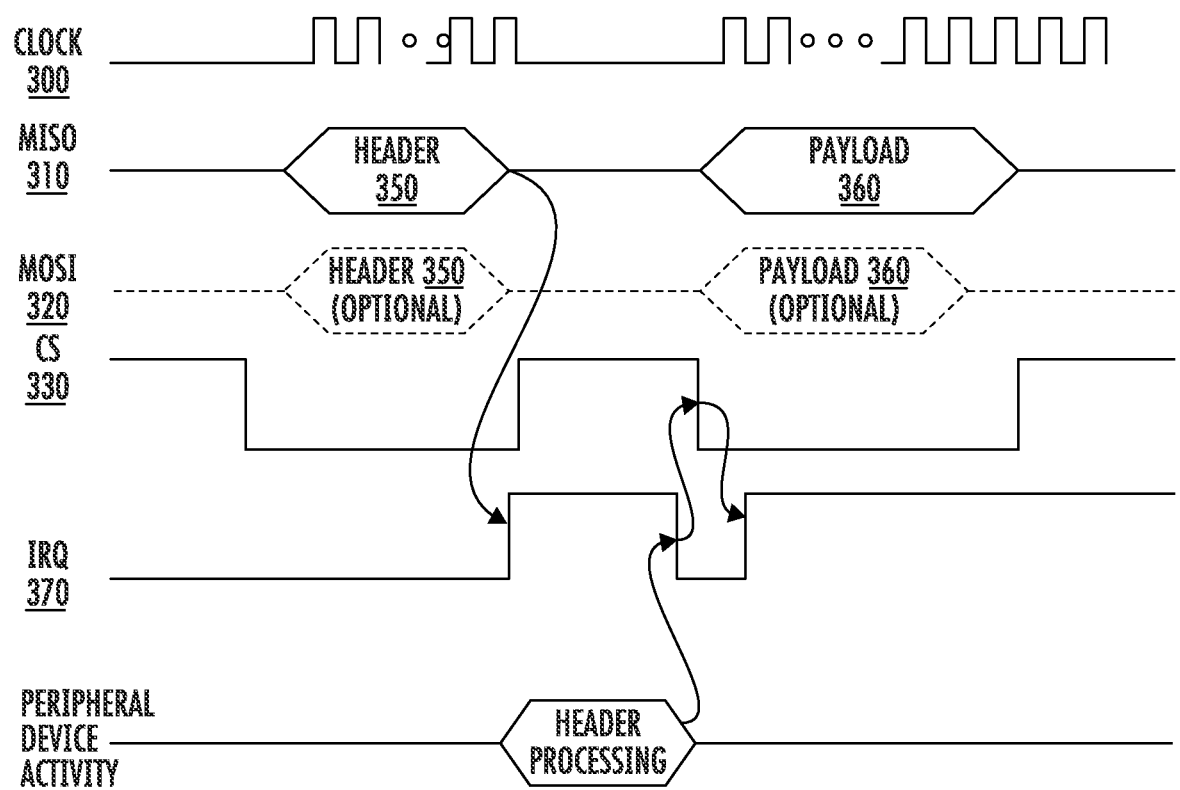
FIG. 7 is a timing diagram associated with the operation shown in FIG. 6.

FIG. 6 shows a flowchart that illustrates the operation of the SPI driver 126 and the peripheral device 10 during a peripheral device initiated transaction according to the present disclosure. This flowchart is also applicable to full duplex bidirectional transactions. FIG. 7 shows a timing diagram that reflects the flow shown in FIG. 6.

Many of the operations described with respect to FIG. 4 are similar in this scenario as well. In this scenario, the peripheral device 10 has data to share with the host 100. Therefore, to indicate this to the host 100, the peripheral device 10 asserts the IRQ signal 370 as shown in Box 600. At this time, the peripheral device 10 may also configure the DMA controller 40 to transmit the header 350 and, subsequently, the payload 360. This may be done by writing two DMA descriptors, where the first descriptor defines the parameters associated with transmitting the header 350 and the second descriptor defines the parameters associated with transmitting the payload 360.

After detecting the assertion of the IRQ signal 370, the host 100 recognizes that the peripheral device 10 has data to transmit to the host 100. Note that the host 100 may also have data to transmit to the peripheral device 10 at this time. Thus, as shown in Box 605, the host 100 asserts the chip select (CS) signal 330. This signifies to the peripheral device 10 that the pending transaction is directed at this device. The host 100 then begins cycling the clock signal 300. The peripheral device 10 transmits the header 350 on the MISO signal 310 as the clock is being toggled, as shown in Box 610.

In some embodiments, the host 100 simply toggles the clock signal 300 and receives the header 350 on the MISO signal 310 from the peripheral device 10. However, in other embodiments, the host 100 also has information to transmit to the peripheral device 10. In these embodiments, in addition to cycling the clock signal 300, and receiving a header from the peripheral device 10, the host 100 also transmits a header 350 on the MOSI signal 320. In both scenarios, after the header 350 is transmitted, the host 100 deasserts the chip select (CS) signal 330.

Thus, in certain embodiments, the peripheral device 10 also receives a header from the host 100, as shown in Box 610.

Immediately after the final byte of the header 350 has been transmitted to the host 100, the peripheral device 10 deasserts the IRQ signal 370, as shown in Box 615. It is at this point that the meaning of the IRQ signal changes from an interrupt signal to a READY signal.

At this time, the peripheral device 10 processes the header that may have been received from the host 100, as shown in Box 620. Box 625 shows the operations that the peripheral device 10 performs after the header 350 is completed. If no header 350 was transmitted by the host 100, the peripheral device 10 does not have to configure the DMA controller 40 to receive any payload. Further, note that if a header 350 was not received from the host 100, the peripheral device 10 does not have to configure the DMA controller 40 to receive the next header, since this was done previously. If there was a header 350 received from the host 100, the peripheral device 10 determines the number of bytes that will be delivered by the host 100 in the payload 360 and configures the DMA controller 40 accordingly. In this scenario, the peripheral device 10 may also configure the DMA controller 40 to receive the next header 350. Once the DMA controller 40 has been properly configured by the peripheral device 10, the peripheral device may then assert the IRQ signal 370, as shown in Box 630.

During this time, the host 100 is waiting for the IRQ signal 370 to be asserted, as shown in Box 635. Once the IRQ signal 370 is asserted (see Box 640), the host 100 may assert the chip select (CS) signal 330, as shown in Box 645. The host 100 then toggles the clock signal 300 to receive the payload 360 from the peripheral device 10 on the MISO signal 310, as shown in Box 650. Optionally, the host 100 also transmits a payload 360 on the MOSI signal 320, which is received by the peripheral device 10. Note that, in the case of full duplex operation, the host 100 toggles the clock signal 300 enough times so as to ensure the transfer of the longer of the host payload and the peripheral device payload. For example, in FIG. 7, the payload transmitted by the peripheral device 10 is larger than that from the host 100. Thus, the host 100 continues to toggle the clock signal 300 until the payload 360 from the peripheral device 10 is received. Following the completion of the payload, the host 100 deasserts the chip select (CS) signal 330, as shown in Box 655.

After the peripheral device 10 asserts the IRQ signal 370, it waits for the chip select (CS) signal 330 to be asserted by the host 100, as shown in Box 660. This indicates that the payload 360 is able to commence. In response, after the chip select (CS) signal 330 is asserted, the peripheral device 10 deasserts the IRQ signal 370, as shown in Box 665. In some embodiments, the deassertion of the IRQ signal 370 may be performed by hardware to ensure that it occurs as soon as possible.

Lastly, as the host 100 is cycling the clock signal 300, the peripheral device 10 is transmitting the payload 360, and optionally receiving a payload from the host 100, as shown in Box 670.

Note that because the peripheral device 10 configures the DMA controller 40 to receive the next header during Boxes 420 and 625, it is able to receive another transmission from the host 100 immediately after the completion of a transaction. Therefore, the peripheral device 10 does not need to stall the host 100 regarding the start of another transmission. In other words, the peripheral device 10 is configured such that all critical operations related to configuration of the DMA controller 40 are accomplished in the period between the end of the header 350 and the start of the payload 360. Thus, the IRQ signal 370 only needs to operate as a READY signal during this time frame.

Note that, as described above, the new system and method also handles CRC errors in the header while remaining synchronized. In the case of CRC errors in a header received by the peripheral device 10, the peripheral device 10 discards all of the bytes that are received, until it sees a low to high transition on the chip select (CS) signal 330. In the case of CRC errors in a header received by the host 100, the host 100 assumes the maximum allowable payload will be sent by the peripheral device 10. This ensures that the peripheral device 10 was able to empty its transmit buffer. Again, the peripheral device 10 uses the low to high transition of the chip select (CS) signal to denote that the transmission is over.

Note that while the above disclosure describes a specific set of operations in a specific order, variations of this approach may be used. For example, while the above disclosure describes the IRQ signal 370 as being deasserted by the peripheral device 10 after the last byte of the header 350 is transmitted, it is understood that this signal may be deasserted any time after the header 350 begins.

This system and method has many advantages. First, the use of the IRQ signal 370 to serve two functions allows interrupt latency resilient operation. In other words, since the host 100 is waiting for the assertion of the IRQ signal from the peripheral device 10 before proceeding, the peripheral device 10 may take as much time as necessary to configure the DMA controllers. Thus, if the processing unit 20 of the peripheral device 10 is executing a higher priority task and does not process the SPI header for an extended period of time, no data will be lost and synchronization is retained.

Further, because the peripheral device 10 is able to stall the host 100 after the transmission of a header 350, the peripheral device 10 is able to determine whether a header was received from the host 100 and configure the DMA controller 40 accordingly, thereby allowing full duplex bidirectional transmissions.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment t for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A method of transmitting a payload from a host to a peripheral device using Serial Peripheral Interface (SPI), the method comprising:
asserting, by the host, a chip select (CS) signal to indicate that a transmission is intended for the peripheral device;
transmitting a header from the host to the peripheral device, wherein the header contains a number of bytes contained in the payload;
ensuring, at the peripheral device, after receipt of a final byte of the header, that an interrupt (IRQ) signal is deasserted, which signals that the peripheral device is not ready to receive the payload;
performing operations at the peripheral device to prepare to receive the payload;
asserting, by the peripheral device, the IRQ signal, after performing the operations, to indicate that the peripheral device is ready to receive the payload; and
transmitting, by the host, the payload after detecting an assertion of the IRQ signal.

2. The method of claim 1, further comprising:
deasserting, by the host, the chip select (CS) signal after transmission of the header;
asserting, by the host, the chip select (CS) signal after seeing the IRQ signal asserted by the peripheral device and before transmitting the payload; and
deasserting, by the host, the chip select (CS) signal after transmitting the payload.

3. The method of claim 2, wherein the host asserts and deasserts the chip select (CS) signal even if the number of bytes in the payload is zero.

4. The method of claim 2, wherein, if the peripheral device detects an error in the header, the peripheral device discards all data until the chip select (CS) signal is deasserted by the host after the payload is transmitted.

5. The method of claim 1, wherein the operations at the peripheral device comprise configuring a direct memory access (DMA) controller to receive the number of bytes of payload indicated by the header.

6. The method of claim 5, wherein the operations at the peripheral device further comprise configuring the DMA controller to receive a subsequent header after receipt of the payload.

7. The method of claim 5, wherein the operations at the peripheral device further comprise servicing other higher priority interrupts.

8. A method of transmitting a payload from a peripheral device to a host using Serial Peripheral Interface (SPI), the method comprising:
- asserting, by the peripheral device, an interrupt (IRQ) signal, indicating that it has data to transmit to the host;
- asserting, by the host, after seeing the IRQ signal asserted, a chip select (CS) signal to indicate that a transmission is intended for the peripheral device;
- transmitting a header to the host from the peripheral device, wherein the header contains a number of bytes contained in the payload;
- ensuring, at the peripheral device, after transmission of a final byte of the header, that the IRQ signal is deasserted, which signals that the peripheral device is not ready to transmit the payload;
- performing operations at the peripheral device to prepare to transmit the payload;
- asserting, by the peripheral device, the IRQ signal, after performing the operations, to indicate that the peripheral device is ready to transmit the payload; and
- transmitting, by the peripheral device, the payload after the host detects an assertion of the IRQ signal.

9. The method of claim 8, further comprising:
- deasserting, by the host, the chip select (CS) signal after receipt of the header;
- asserting, by the host, the chip select (CS) signal after seeing the IRQ signal asserted by the peripheral device and before receiving the payload; and
- deasserting, by the host, the chip select (CS) signal after receiving the payload.

10. The method of claim 8, wherein the operations at the peripheral device comprise determining whether the host is also transmitting a payload to the peripheral device.

11. The method of claim 8, wherein, if the host detects an error in the header, the host assumes a maximum payload to ensure that the peripheral device is able to transmit its entire payload.

12. The method of claim 8, wherein, in a case of full duplex operation, the host also has a payload to transmit to the peripheral device; and wherein the host transmits a header to the peripheral device having a same length as the header transmitted by the peripheral device; wherein the host transmits the header at the same time that the header is transmitted by the peripheral device.

13. The method of claim 12, wherein the host transmits a payload to the peripheral device at a same time that the payload is transmitted to the host.

14. The method of claim 12, wherein the operations at the peripheral device comprise configuring a direct memory access (DMA) controller to receive the number of bytes of payload indicated by the header transmitted by the host.

15. The method of claim 14, wherein the operations at the peripheral device further comprise configuring the DMA controller to receive a subsequent header after receipt of the payload.

16. A method of transmitting a payload from a host to a peripheral device using Serial Peripheral Interface (SPI), the method comprising:
- transmitting a header from the host to the peripheral device, wherein the header contains a number of bytes contained in the payload;
- using, by the peripheral device, an interrupt (IRQ) signal to indicate whether it is ready to receive the payload; and
- transmitting the payload from the host to the peripheral device after seeing the IRQ signal asserted,
- wherein the IRQ signal serves as a READY signal between an end of the header and a start of the payload, and serves as an interrupt signal at all other times.

* * * * *